United States Patent
Hunt et al.

(10) Patent No.: US 10,520,383 B2
(45) Date of Patent: Dec. 31, 2019

(54) TEMPERATURE-COMPENSATING ABSOLUTE PRESSURE SENSOR

(71) Applicant: Rosemount Inc., Chanhassen, MN (US)

(72) Inventors: Charles Edwin Hunt, Big Lake, MN (US); Daniel Alan Norberg, New Brighton, MN (US)

(73) Assignee: Rosemount Inc., Shakopee, MN (US)

( * ) Notice: Subject to any disclaimer, the term of this patent is extended or adjusted under 35 U.S.C. 154(b) by 19 days.

(21) Appl. No.: 15/281,723

(22) Filed: Sep. 30, 2016

(65) Prior Publication Data

US 2018/0094997 A1   Apr. 5, 2018

(51) Int. Cl.
| | |
|---|---|
| *G01L 19/04* | (2006.01) |
| *G01L 13/02* | (2006.01) |
| *G01L 19/00* | (2006.01) |
| *G01L 27/00* | (2006.01) |

(52) U.S. Cl.
CPC ............ *G01L 19/04* (2013.01); *G01L 13/023* (2013.01); *G01L 13/025* (2013.01); *G01L 19/0046* (2013.01); *G01L 27/002* (2013.01)

(58) Field of Classification Search
CPC ...... G01L 19/04; G01L 13/023; G01L 27/002
USPC .......................................................... 73/708
See application file for complete search history.

(56) References Cited

U.S. PATENT DOCUMENTS

| | | | | | |
|---|---|---|---|---|---|
| 3,472,077 | A | * | 10/1969 | Bucalo | ...................... G01L 7/00 200/83 D |
| 5,870,695 | A | * | 2/1999 | Brown | ..................... G01F 1/363 702/138 |
| 7,448,275 | B1 | * | 11/2008 | Sundet | .................. G01L 13/025 73/706 |
| 2005/0072243 | A1 | * | 4/2005 | Broden | ................. G01L 13/025 73/715 |
| 2011/0299647 | A1 | * | 12/2011 | Chivers | .................. G21C 17/02 376/245 |
| 2013/0320662 | A1 | * | 12/2013 | Norberg | .............. G01L 19/0007 285/3 |

OTHER PUBLICATIONS

International Search Report and Written Opinion for International Patent Application No. PCT/US2017/052627, dated Jan. 4, 2018, 19 pages.

(Continued)

*Primary Examiner* — Jamel E Williams
(74) *Attorney, Agent, or Firm* — Christopher R. Christenson; Kelly, Holt & Christenson PLLC (57) ABSTRACT

A differential pressure transmitter configured to provide an absolute pressure measurement is presented. The differential pressure sensor comprises a first process fluid inlet. The differential pressure sensor also comprises a second process fluid inlet. The differential pressure sensor also comprises a differential pressure sensor operably coupled to the first and second process fluid inlets. The differential pressure sensor also comprises an absolute pressure cap coupled to the second pressure inlet. The cap comprises a volume of gas within an expansion feature. The volume of gas has a reference pressure. The expansion feature is configured to allow for expansion of the volume of gas in response to a temperature increase, such that the volume of gas maintains the reference pressure.

14 Claims, 6 Drawing Sheets

(56) References Cited

OTHER PUBLICATIONS

"Rosemount Manifolds", Product Data Sheet 00813-0100-4733, dated Aug. 2016, 32 pages.
First Chinese Office Action dated Jun. 25, 2019 for Chinese Patent Application No. 201710014197.8. 17 pages including English translation.

* cited by examiner

TEMPERATURE-COMPENSATING ABSOLUTE PRESSURE SENSOR

BACKGROUND

A process variable transmitter generally includes a transducer, or sensor, that responds to a process variable—a chemical or physical state of matter or conversion of energy. Examples of process variables measured in a process environment include pressure, temperature, flow, conductivity, pH, and other relevant properties. Pressure is a basic process variable that can be used to derive measurements of flow, level, and temperature.

Process fluid pressure transmitters are coupled to a process using an instrument manifold, or flange. A process fluid pressure transmitter is a field device that is mountable in a process installation and is commonly used in industrial processes to measure and monitor pressures of various industrial process fluids, such as slurries, liquids, vapors, and gases of chemical, pulp, petroleum, gas, pharmaceuticals, food, and other fluid type processing plants.

SUMMARY

A differential pressure transmitter configured to provide an absolute pressure measurement is presented. The differential pressure sensor comprises a first process fluid inlet. The differential pressure sensor also comprises a second process fluid inlet. The differential pressure sensor also comprises a differential pressure sensor operably coupled to the first and second process fluid inlets. The differential pressure sensor also comprises an absolute pressure cap coupled to the second pressure inlet. The cap comprises a volume of gas within an expansion feature. The volume of gas has a reference pressure. The expansion feature is configured to allow for expansion of the volume of gas in response to a temperature increase, such that the volume of gas maintains the reference pressure.

DETAILED DESCRIPTION OF ILLUSTRATIVE EMBODIMENTS

Differential pressure transmitters generally include a first and second process pressure fluid inputs which are operably coupled to a differential pressure sensor, located within the transmitter, that is configured to respond to a detected difference in pressure between the two inputs. Differential pressure transmitters typically include a differential pressure sensor operably coupled to a pair of isolator diaphragms, each positioned at one of the process fluid inlets. The isolator diaphragm serves to isolate the differential pressure sensor from a process fluid. Pressure is transferred from the process fluid to the differential pressure sensor through a substantially incompressible fill fluid carried in a passageway extending from each isolator diaphragm to the differential pressure sensor.

One differential pressure sensor configuration includes an instrument manifold that presents the process fluid pressure inlets in a pair of substantially coplanar ports. One example of such a manifold is sold under the trade designation Model 375 Coplanar™ available from Rosemount Inc. of Chanhassen, Minn.

In at least some scenarios, it is advantageous to have a pressure transmitter configured to provide a pressure reading reference to an absolute pressure instead of a differential pressure measurement. It would be advantageous to be able to convert a differential pressure sensor into an absolute pressure sensor. However, the absolute pressure sensor must be able to provide an accurate pressure reading in a variety of environments, across a range of environmental pressures and temperatures.

Figure 1A:
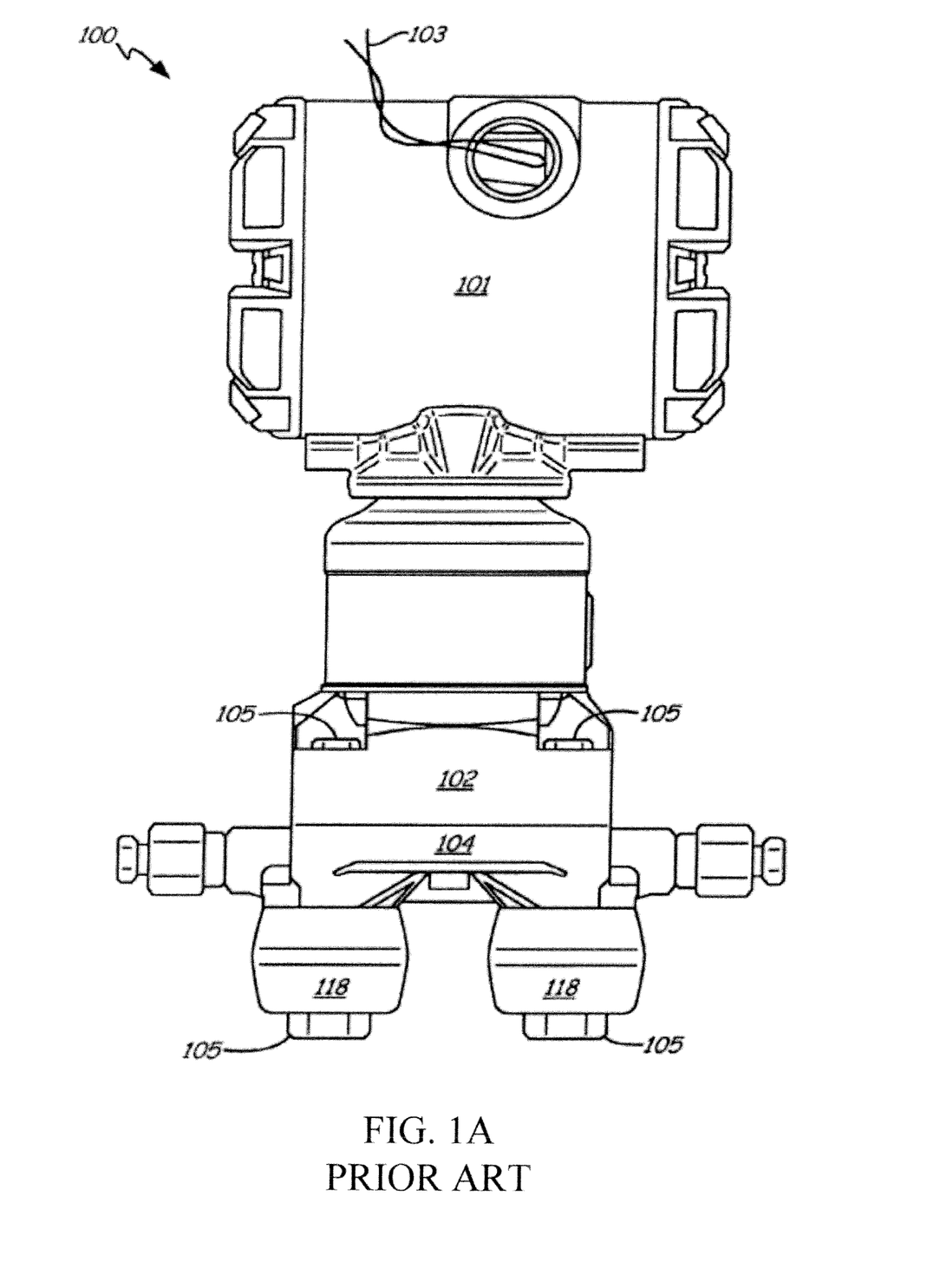
FIGS. 1A-1C illustrate a plurality of views of one example of a prior art pressure transmitter.
Figure 1B:
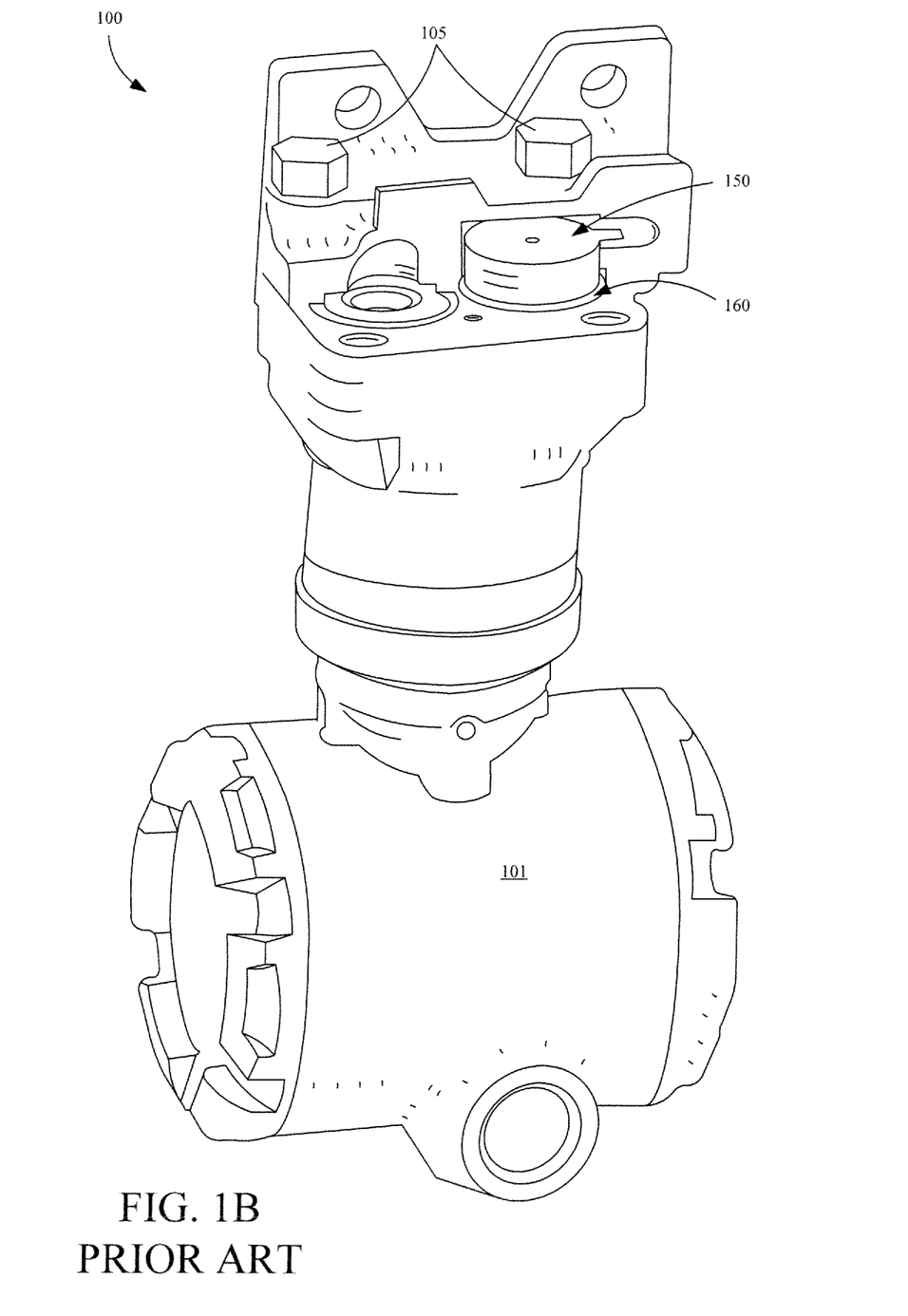
Figure 1C:
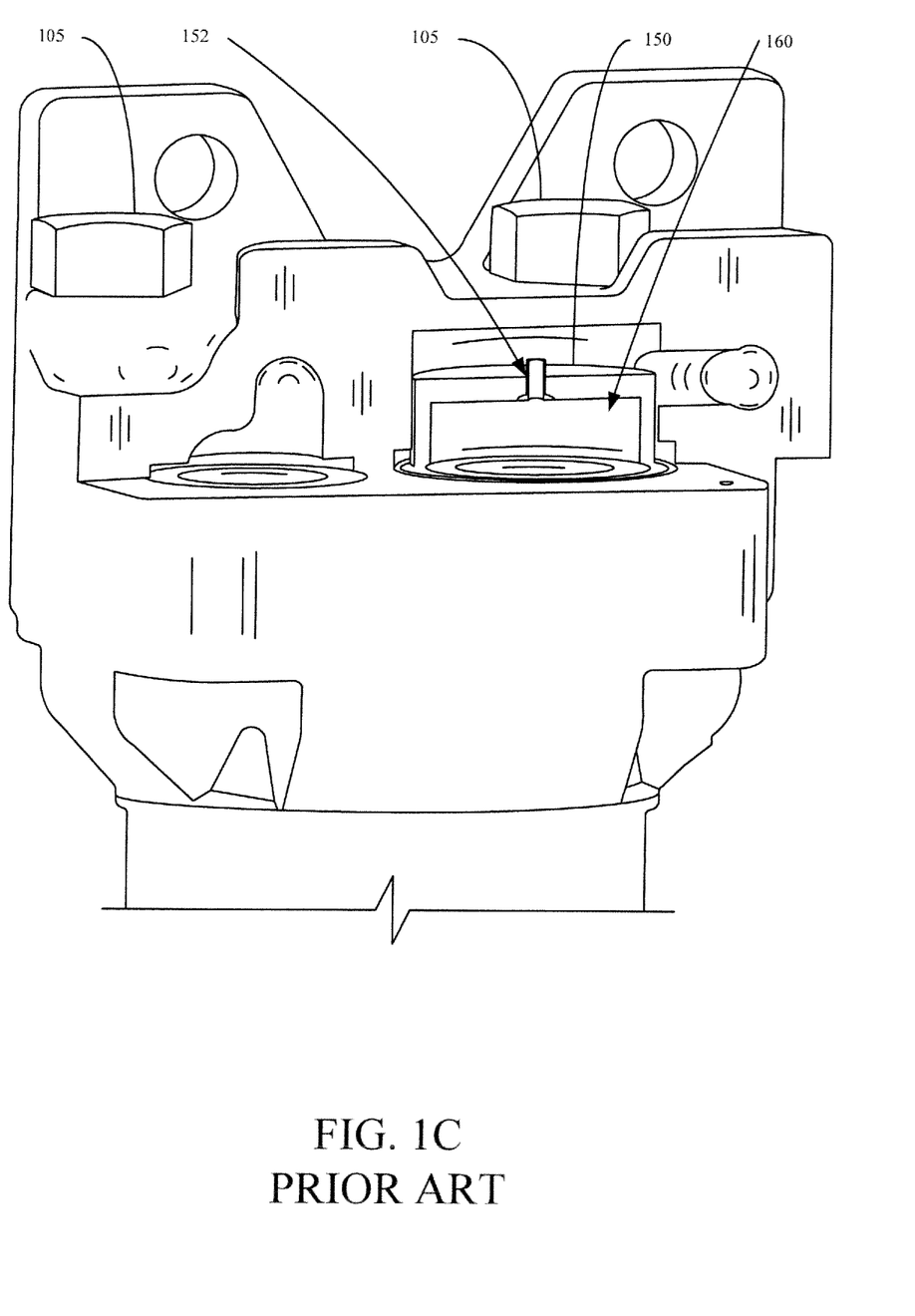

FIGS. 1A-1C provide a number of views of a prior art pressure transmitter. Transmitter 100 employs a differential pressure sensor configured to output an absolute pressure reading. Pressure transmitter 100 includes housing 101 configured to house electronic circuitry. Pressure transmitter also includes a pressure sensor module housing 102, which houses isolator diaphragms, and associated sensor circuitry. Pressure sensor module housing 102 is bolted to a pressure flange 104 by one or more bolts 105. Bolts 105 also pass through flange adapter unions 118. Flange adapter unions 118 may have threaded inlets connected to threaded process pipes (not illustrated). Pressure flange 104 is configured to communicate one or more process fluid pressures to transmitter 100, for process measurement. Pressure transmitter 100 is connected to a process loop 103 that energizes pressure transmitter 100 and provides bidirectional communication for use in a process control system. Pressure sensor module housing 102 includes isolator diaphragms that are directly coupled to pressure sensor module housing 102, which includes threaded bolt holes positioned around each isolator diaphragm.

An absolute pressure transmitter can be created by converting a differential transmitter, as shown more clearly in FIG. 1B, described below. The conversion is accomplished by attaching a sealed reference pressure to the low pressure side process connection of a differential pressure sensor. The sealed reference is generally created by welding an absolute pressure (AP) cap to a weld ring on the transmitter low pressure side.

FIG. 1B illustrates a view of a pressure transmitter 100 with an absolute pressure cap 150. Absolute pressure cap 150 is, for example, welded to a weld ring 160 on the low pressure input of transmitter 100, such that the differential pressure sensor reports the difference between the high pressure side, coupled to a process fluid, and the pressure within an absolute pressure cap. At installation, when the absolute pressure cap 150 is welded to weld ring 160, gas, such as air or nitrogen, with a particular pressure value is sealed into absolute pressure cap 150, for example by applying a vacuum pressure to, and then sealing, tube 152. The pressure value inside cap 150 establishes a known reference for the differential pressure sensor. The pressure inside cap 150 is not necessarily set to 0 pressure, or a perfect vacuum, which can present a risk of off-gassing within the oil filled system under the isolator. Therefore, the vacuum level inside cap 150 is often set at a known pressure value above 0 (for example 1 PSIA-5 PSIA) to reduce the risk of off-gassing. A calibration step can be used, for example at installation, to account for the reference pressure in the absolute pressure cap. A known pressure of gas within cap 150 may allow for a transmitter to give an accurate absolute pressure output after calibration, assuming the pressure within cap 150 does not change significantly over the operational life of transmitter 100.

FIG. 1C illustrates a cut-away view of an absolute pressure sensor 100. While absolute pressure cap 150 provides a steady reference pressure, trapped gas 160 inside absolute pressure cap 150 can impact transmitter performance in process environments that experience changes in ambient temperature and pressure. As temperature changes, trapped gas 160 responds in accordance with the ideal gas law, Equation 1 below:

$$PV=nRT \quad \text{Equation 1}$$

Where P is the pressure experienced by an amount, n of gas, within volume V, at a temperature T. R is the ideal gas constant. As the amount of gas, n, remains constant within the constant volume, V, of the absolute pressure cap, the relationship between pressure. P, of the absolute pressure cap and changing ambient temperature, T, can be explained by Amonton's law. Specifically, Amonton's law states that for a constant number of moles of gas in an unchanged volume, absolute pressure is directly proportional to the absolute temperature, as indicated in Equation 2 below:

$$\frac{P_1}{P_2} = \frac{T_1}{T_2} \quad \text{Equation 2}$$

$P_1$ and $T_1$ represent the initial pressure and temperature within absolute pressure cap 150 during installation. $P_2$ and $T_2$ represent a subsequent state of trapped gas 160. Therefore, if the temperature increases from 20° C. (293 K) to 93° C. (366 K), the pressure inside absolute pressure cap 150 will increase by a factor of 1.25, or an additional 25%. In such a case, the transmitter output will be directly affected by the pressure change, experiencing an error correlating to the temperature increase.

Temperature changes in particular may affect the output of a differential pressure sensor 100 using the reference cap described above as many such sensors are not in a constant temperature environment. As pressure sensor 100 experiences changing temperatures, trapped gas 160 remains at a fixed volume, not free to expand or contract. This can result in changing pressures within absolute pressure cap 150, causing it to deviate from the 'reference pressure' set during installation. Therefore, as the pressure within absolute pressure cap 150 changes, transmitter 100 will experience an error in pressure measurement that changes with the ambient temperature. This is especially true for a pressure transmitter calibrated for use in lower pressure ranges because errors from temperature fluctuations can constitute a significant portion of the calibrated pressure span. At high pressure ranges, cap 150 can also produce significant errors when transmitter 100 is exposed to large temperature changes. Therefore, a converted differential pressure to absolute pressure sensor is desired that can maintain a constant accuracy despite an environment subject to changes in ambient temperature.

Figure 2:
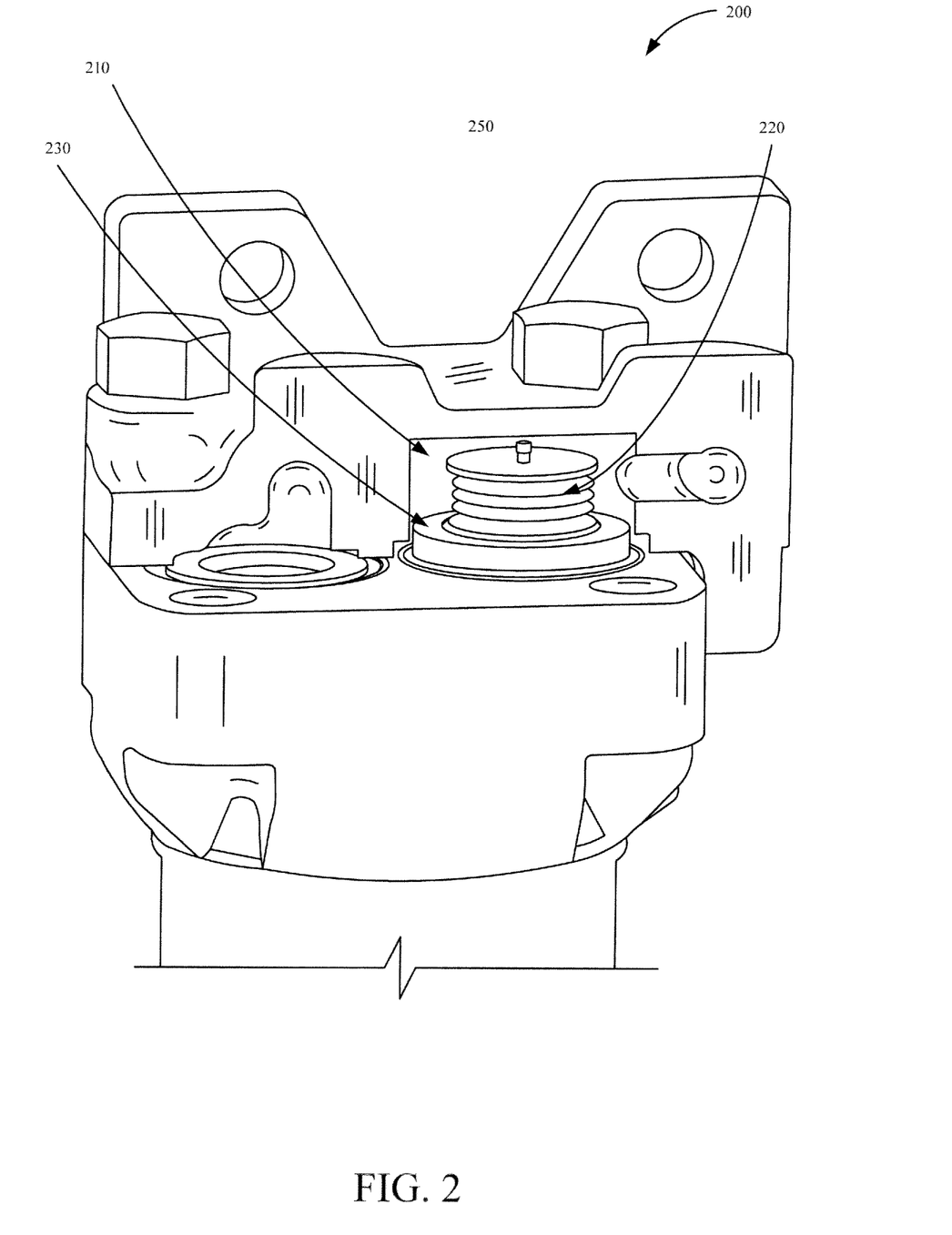
FIG. 2 illustrates an absolute pressure sensor in accordance with an embodiment of the present invention.

FIG. 2 illustrates an absolute pressure sensor in accordance with an embodiment of the present invention. One way to prevent pressure measurement error due to ambient temperature changes is to allow for, or cause, volume changes within the reference pressure cap in a manner that adequately compensates for the ambient temperature change. As noted above with respect to the ideal gas law, pressure and temperature can both be correlated to volume change. Therefore, providing an environment where a volume of gas is free to expand or contract, the pressure within an absolute pressure cap is less likely to experience a temperature-based error as ambient temperature changes.

One example of a differential pressure transmitter design that can provide such a solution is presented in FIG. 2. FIG. 2 illustrates a portion of a differential pressure transmitter 200 configured to provide an absolute pressure measurement. In one embodiment, pressure transmitter 200 comprises a cavity 210 configured to vent to an atmosphere 250. An expansion element 220 is disposed within cavity 210. In one embodiment, expansion element 220 comprises a bellows configured to partially open and partially close as a volume of gas expands and contracts. In one embodiment, bellows 220 comprises a substantially incompressible material such that a change in operational volume is substantially only due to mechanical actuation of bellows 220, and not due to any material expansion.

Bellows 220 contains an initial volume of trapped gas that, in response to a change in temperature, causes bellows 220 to expand or contract in response to the temperature change. In one embodiment, bellows 220 comprises a substantially incompressible material such that the change in volume is substantially only due to the bellows 220 unfolding and refolding as gas within bellows 220 expands and contracts in response to temperature increases and decreases, and not due to any change in the thickness of the walls of bellows 220. In one embodiment, bellows 220 is configured to reversibly expand and contract such that a pressure of trapped gas is maintained.

In one embodiment, bellows 220 is welded directly to a rigid cap 230. Bellows 220 may be configured to open or close, without sufficient change in the material thickness of bellows 220, in response to an experienced ambient temperature change. The material comprising bellows 220 can be selected in order to ensure a proper amount of travel or displacement within the sealed compartment of the process flange, in response to a temperature increase. In one embodiment, bellows 220 comprises a material stiff enough to maintain an initial volume at installation, but malleable enough to mechanically deploy in response to a temperature increase. In one embodiment, bellows 220 is configured to return to the installation position, and may even close further, in response to a subsequent temperature decrease. In one embodiment, bellows 220 comprises a material that does not experience significant change in thickness in response to temperature change, such that the volume only changes with the bellows opening and closing. Thus, bellows 220 actuates in response to a temperature change, such that a change in volume of bellows 220 is substantially only caused by a change in the expansion or contraction of gas trapped within bellows 220.

In one embodiment, cavity 210 remains open to atmosphere 250, such that bellows 220 expands and contract freely, without experiencing an expansion or contraction counterforce from gas within cavity 210. However, in another embodiment, cavity 210 may be closed to atmosphere 250. Such a configuration may be useful in an application in which the low pressure side of the transmitter is exposed to large increases in ambient atmospheric pressure. Therefore, for applications in which the ambient pressure 250 is subject to significant change, pressure transmitter 200 may provide a more accurate result if cavity 210 is sealed from atmosphere 250. However, for the majority of applications, the magnitude of errors induced by fluctuating ambient pressure in atmosphere 250 is significantly less than errors resulting from changing temperatures in atmosphere 250. In one embodiment, the process cavity 210 is plumbed to a known reference or location not subject to substantial pressure changes.

Figure 3A:
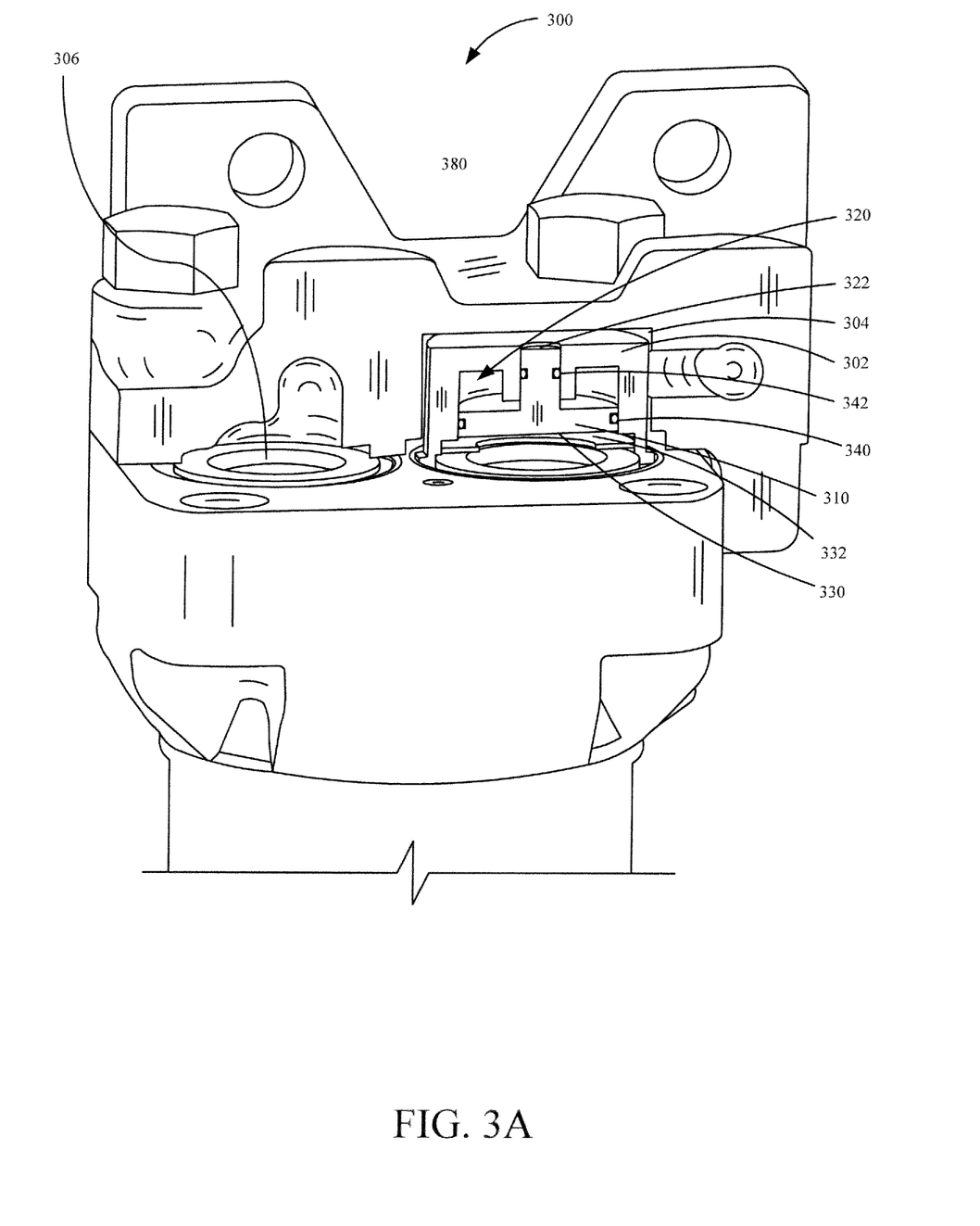
FIGS. 3A and 3B illustrate an absolute pressure sensor in accordance with another second embodiment of the present invention.
Figure 3B:
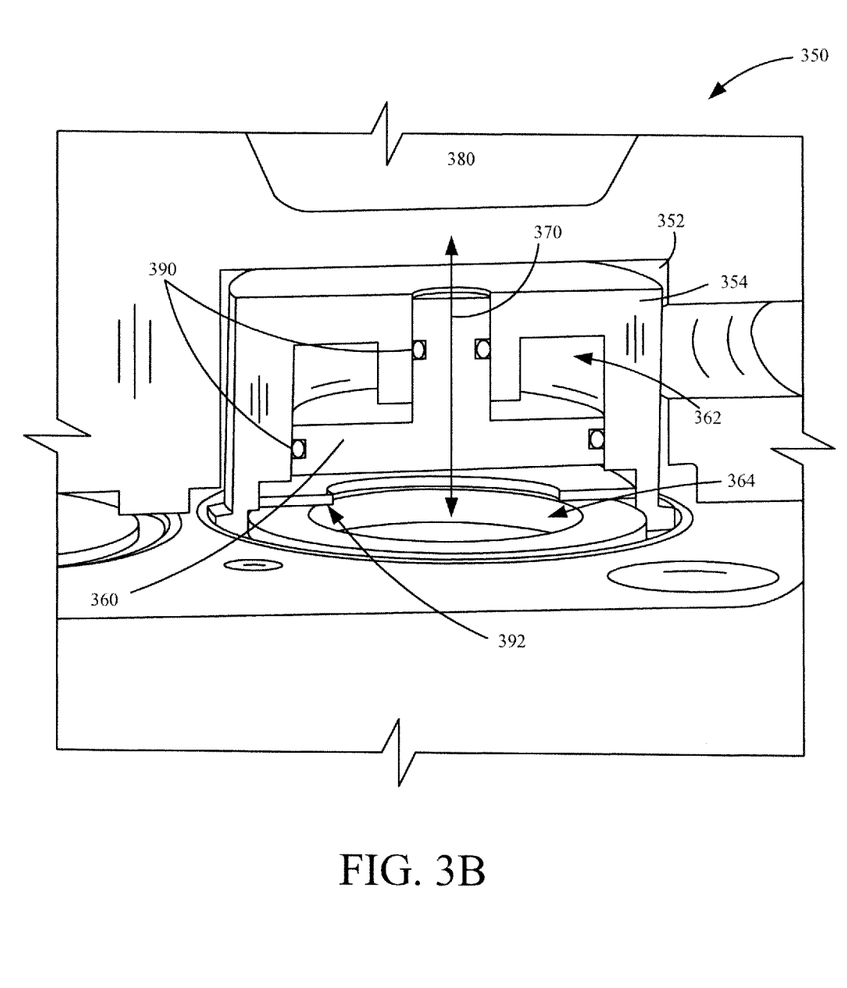

FIGS. 3A and 3B illustrate an absolute pressure sensor in accordance with another embodiment of the present invention. In the illustrated embodiment, absolute pressure transmitter 300 comprises a converted differential pressure transmitter configured to provide an absolute pressure measurement as an output. The differential pressure transmitter 300 is converted into an absolute pressure transmitter through use of an absolute pressure piston 310. Piston 310, in one embodiment, is positioned within an absolute pressure cap 302, located within a cavity 304 on a low pressure side of the differential pressure transmitter. In one embodiment, the low pressure side of the differential pressure transmitter is coplanar to a high pressure side 306, which is configured to be exposed to, and measure, a process fluid pressure.

In one embodiment, first area 320 and second area 330 are disposed within cap 302. Piston 310 is configured to move within cap 302, in response to ambient temperature changes, in one embodiment, such that a volume of gas within area 330 can expand or contract within absolute pressure cap 302. In one embodiment, first area 320 is designed to be smaller than second area 330, such that differences in pressure on either side of piston 310 are accommodated. However, in other embodiments, areas 320 and 330 may be substantially similar, or area 320 may be larger than area 330. The force applied to each side of piston 310, in one embodiment, is equal to the experienced pressure multiplied by the exposed areas 322 and 332 of piston 310. In one embodiment, piston 310 is configured such that the ratio of piston areas 322 and 332 has a relationship to the ratio of atmospheric pressure and the initial sealed reference pressure within cap 302. The configuration of pressure transmitter 300 may, in one embodiment, create a balance in forces when cap 302 is initially evacuated to a specified vacuum level. While FIG. 3A illustrates a cut-away view of cap 302, in order to show the workings of piston 310, it should be noted that areas 322 and 332 indicate the full surface areas on piston 310, in an installed environment. A spring may be attached to the piston 310 to provide a specified relationship between force and piston displacement.

In one embodiment, piston 310 is sealed within cap 304 by one or more O-ring seals 340 and 342. O-ring seals 340 and 342 are configured, in one embodiment, to seal a trapped gas within area 330 of absolute pressure cap 304. In one embodiment, transmitter 300 comprises a first O-ring seal 340 and second O-ring seal 342, with first O-ring seal 340 being configured to seal piston area 320 from piston area 330, and second O-ring seal 342 being configured to seal a piston area 320 from atmosphere 380.

FIG. 3B illustrates another view of an absolute pressure cap similar to that shown in FIG. 3A, with similar features numbered similarly. In one embodiment, as shown in FIG. 3B, first volume 362 of absolute pressure cap 354 is vented to cavity 352, which is vented to atmosphere 380. While O-ring seals 390 are illustrated in the embodiment of FIG. 3B, other appropriate sealing mechanisms that allow for a piston 360 to move within an absolute pressure cap 354 could also be used, in other embodiments. In one embodiment, absolute pressure cap 354 is configured such that it contains piston 360, which is configured to move along the directions indicated by arrow 370 as a trapped volume of reference gas expands and contracts. In one embodiment, arrow 370 represents an expansion axis along which piston 360 moves. Piston 360 separates a first volume 362 from a second volume 364. The atmospheric pressure within first volume 362 interacts with the pressure of the reference gas in second volume 364 to move piston 360. Once the assembly of pressure transmitter 300 is complete, piston 360 is configured to move freely as temperature changes, such that a reference pressure is substantially maintained by the gas expanding with a temperature increase and contracting with a temperature decrease.

In one embodiment, a stop 392 is included within pressure cap 354 in order to prevent excessive contraction of gas within volume 364, for example, under large ambient temperature conditions. Stop 392 may be configured such that if the low pressure side is exposed to atmosphere, the effects of excessive atmospheric pressure increases can be prevented while still obtaining the benefits of improved transmitter performance during certain temperature excursions. In one embodiment, stop 392 comprises a protrusion along an inner circumference of a weld ring such that movement of piston 360 is limited in the downward direction indicated by arrow 370.

In one embodiment, as shown in FIG. 3B, one or more O-rings 390 are provided as seals between piston 360 and cap 352. A first O-ring 390 is configured to separate a volume 362 from a volume 364, and a second O-ring 390 is configured to separate volume 362 from a cavity 354.

Using any of the embodiments presented herein may allow for use of a differential pressure transmitter to provide an absolute pressure measurement. At least some embodiments provided herein present significant improvements over prior art absolute pressure caps with regard to ambient temperature and pressure changes. The embodiments described herein allow for operating with a higher reference pressure within an absolute pressure cap, reducing the risk of off-gassing, while providing better mitigation of temperature effects in the atmosphere. Because of the ability to mitigate temperature effects, the proposed design may allow the absolute pressure designed to be used on lower pressure ranges, previously unavailable to convert a differential pressure sensor. For example, fixed cap absolute pressure designs, such as those of FIG. 1, are currently only available for ranges with an upper range limit greater than 1000 inches of water.

The embodiments illustrated herein may also provide some damping for sudden changes in pressure. Additionally, the embodiments provided herein allow for an absolute pressure cap to expand and contract independent of changes in the material of the absolute pressure cap. The absolute pressure cap, in one embodiment, is sufficiently stiff such that it does not experience a significant volume change in response to temperature effects.

Although the present invention has been described with reference to preferred embodiments, workers skilled in the art will recognize that changes may be made in form and detail without departing from the spirit and scope of the invention.

What is claimed is:

1. A differential pressure transmitter configured to provide an absolute pressure measurement, the differential pressure transmitter comprising:
   a first process fluid inlet;
   a second process fluid inlet; and
   a differential pressure sensor operably coupled to the first and second process fluid inlets;
   an absolute pressure cap coupled to the second process fluid inlet, the cap comprising a piston with a volume of gas having a reference pressure;
   a first piston area exposed on the piston;

a second piston area exposed on the piston; and wherein the piston is configured such that a ratio of the first piston area and the second piston area has a relationship to a ratio of atmospheric pressure and the reference pressure within the absolute pressure cap.

2. The differential pressure transmitter of claim 1, wherein the absolute pressure cap is formed of a substantially incompressible material such that expansion of the volume of gas is substantially only caused by mechanical actuation of the expansion feature.

3. The differential pressure transmitter of claim 1, wherein the piston is configured to allow for contraction of the volume of gas in response to a temperature decrease.

4. The differential pressure transmitter of claim 1, wherein the absolute pressure cap is located within a cavity configured to vent to an atmosphere.

5. The differential pressure transmitter of claim 1, wherein the first process fluid inlet comprises a high pressure process fluid inlet.

6. The differential pressure transmitter of claim 5, wherein the high pressure process fluid inlet couples to the process fluid through an isolator diaphragm.

7. The differential pressure transmitter of claim 1, wherein the second process fluid inlet is a is a lower pressure process fluid inlet configured to couple to a process fluid.

8. An absolute pressure sensing system comprising:
a first pressure inlet configured to couple to a process fluid;
a second pressure inlet coupled to a reference pressure cap, wherein the reference pressure cap comprises a quantity of gas at a reference pressure within a piston;
a differential pressure sensor coupled to the first and second pressure inlets to measure a difference in pressure between the first and second pressure inlets;
a first piston area exposed on the piston;
a second piston area exposed on the piston; and
wherein the piston is configured such that a ratio of the first piston area and the second piston area has a relationship to a ratio of atmospheric pressure and the reference pressure within the reference pressure cap.

9. The absolute pressure sensing system of claim 8, wherein the reference pressure cap is formed of a substantially incompressible material and the piston is configured to mechanically actuate in response to an experienced change in ambient temperature such that the reference pressure is maintained, wherein mechanically actuating causes a volume of the quantity of gas to change.

10. The absolute pressure sensing system of claim 9, wherein changing the volume of the quantity of gas comprises the piston at least partially expanding in response to an increase in temperature and at least partially contracting in response to a decrease in temperature.

11. The absolute pressure sensing system of claim 8, wherein the reference pressure cap is welded to the second pressure inlet.

12. A conversion mechanism configured to couple to a differential pressure transmitter, the conversion mechanism comprising:
a piston;
a first piston area exposed on the piston;
a second piston area exposed on the piston;
a coupling feature configured to couple the conversion mechanism to a low pressure inlet of the differential pressure sensor;
wherein the piston is configured such that a ratio of the first piston area and the second piston area has a relationship to a ratio of atmospheric pressure and a reference pressure within an absolute pressure cap; and
wherein, when coupled to the differential pressure sensor, the piston is configured to contain a known volume of gas at the reference pressure, and wherein the piston, upon mechanical actuation, reversibly change in response to a change in ambient temperature such that the reference pressure is maintained within the piston.

13. The conversion mechanism of claim 12, wherein the conversion mechanism is formed of a substantially incompressible material such that the reference pressure is maintained substantially only by the mechanical actuation of the piston.

14. The conversion mechanism of claim 12, wherein the coupling feature comprises a weld ring.

* * * * *